United States Patent
Loehl

(10) Patent No.: US 11,890,558 B2
(45) Date of Patent: Feb. 6, 2024

(54) FILTER SYSTEM COMPRISING A FILTER ELEMENT AND SECONDARY ELEMENT FOR CLOSING A CENTRAL TUBE

(71) Applicant: MANN+HUMMEL GmbH, Ludwigsburg (DE)

(72) Inventor: Thomas Loehl, Mundelsheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 887 days.

(21) Appl. No.: 16/723,420

(22) Filed: Dec. 20, 2019

(65) Prior Publication Data

US 2020/0197842 A1 Jun. 25, 2020

Related U.S. Application Data

(63) Continuation of application No. PCT/EP2018/065966, filed on Jun. 15, 2018.

(30) Foreign Application Priority Data

Jun. 21, 2017 (DE) .......................... 102017005797.4

(51) Int. Cl.
*B01D 29/96* (2006.01)
*B01D 29/00* (2006.01)
(Continued)

(52) U.S. Cl.
CPC ......... *B01D 29/96* (2013.01); *B01D 29/0013* (2013.01); *B01D 29/0097* (2013.01);
(Continued)

(58) Field of Classification Search
None
See application file for complete search history.

(56) References Cited

U.S. PATENT DOCUMENTS

| | | | |
|---|---|---|---|
| 5,215,655 A * | 6/1993 | Mittermaier | B01D 29/23 137/493 |
| 5,350,506 A * | 9/1994 | Dombek | B01D 27/106 210/DIG. 17 |

(Continued)

FOREIGN PATENT DOCUMENTS

| | | |
|---|---|---|
| CA | 2166365 A1 | 7/1996 |
| DE | 19933205 A1 | 1/2001 |

(Continued)

*Primary Examiner* — Brit E. Anbacht

(57) ABSTRACT

A filter system for filtering fluid has a filter housing with inlet socket and outlet socket for fluid. A central tube with radially open region over a portion of its axial length is arranged in the filter housing in flow communication with the outlet socket in an operating state. Within the central tube, a secondary element is arranged slidably between first and second operating positions. A filter element, separating a raw fluid side from a clean fluid side, has a filter bellows with a first end plate at a first end face and a second end plate at a second end face. The end plates have central openings for receiving the central tube in the filter element interior. In the first operating position, the secondary element opens a fluid path through the radially open region of the central tube and closes the fluid path in the second operating position.

18 Claims, 4 Drawing Sheets

(51) Int. Cl.
    *B01D 35/30*     (2006.01)
    *B01D 46/64*     (2022.01)
    *B01D 46/00*     (2022.01)
    *B01D 35/00*     (2006.01)
    *F02M 35/024*     (2006.01)

(52) U.S. Cl.
    CPC ......... *B01D 35/30* (2013.01); *B01D 46/0005* (2013.01); *B01D 46/0097* (2013.01); *B01D 46/64* (2022.01); *B01D 35/005* (2013.01); *B01D 2201/0415* (2013.01); *B01D 2201/295* (2013.01); *B01D 2265/06* (2013.01); *F02M 35/02433* (2013.01)

(56) References Cited

U.S. PATENT DOCUMENTS

| | | | |
|---|---|---|---|
| 5,468,386 A * | 11/1995 | Ardes | B01D 35/153 |
| | | | 210/453 |
| 7,056,432 B2 * | 6/2006 | Smith | B01D 35/147 |
| | | | 210/171 |
| 9,410,456 B2 * | 8/2016 | Mavroidakos | F01M 11/03 |
| 9,555,350 B2 * | 1/2017 | Ardes | B01D 35/1475 |
| 2002/0162782 A1 * | 11/2002 | Maxwell | B01D 27/106 |
| | | | 210/440 |
| 2003/0015465 A1 * | 1/2003 | Fick | B01D 29/21 |
| | | | 210/450 |
| 2004/0065602 A1 | 4/2004 | Moscaritolo et al. | |
| 2004/0069700 A1 * | 4/2004 | Miller | B01D 35/153 |
| | | | 210/235 |
| 2006/0213821 A1 * | 9/2006 | Choi | B01D 35/30 |
| | | | 210/136 |
| 2012/0267293 A1 * | 10/2012 | Ardes | B01D 35/147 |
| | | | 210/418 |
| 2014/0326081 A1 | 11/2014 | Pierry | |
| 2015/0217218 A1 | 8/2015 | Caliendo et al. | |
| 2020/0190779 A1 * | 6/2020 | Wagner | E03C 1/10 |
| 2021/0113943 A1 * | 4/2021 | Grange | B01D 29/92 |

FOREIGN PATENT DOCUMENTS

| | | | | |
|---|---|---|---|---|
| DE | 10135080 A1 | 1/2003 | | |
| DE | 102005029223 A1 | 2/2006 | | |
| DE | 102014012947 A1 | 3/2015 | | |
| DE | 102013017667 A1 * | 4/2015 | ............ | B01D 29/21 |
| EP | 1163039 B1 | 12/2001 | | |
| EP | 1322855 B1 | 7/2003 | | |
| EP | 2086663 B1 | 8/2009 | | |
| EP | 2510995 A1 | 10/2012 | | |
| EP | 2881156 A1 * | 6/2015 | ............ | B01D 29/21 |
| GB | 1553011 A | 9/1979 | | |

* cited by examiner

FILTER SYSTEM COMPRISING A FILTER ELEMENT AND SECONDARY ELEMENT FOR CLOSING A CENTRAL TUBE

CROSS-REFERENCE TO RELATED APPLICATIONS

This application is a continuation application of international application No. PCT/EP2018/065966 having an international filing date of 15 Jun. 2018 and designating the United States, the international application claiming a priority date of 21 Jun. 2017 based on prior filed German patent application No. 10 2017 005 797.4, the entire contents of the aforesaid international application and the aforesaid German patent application being incorporated herein by reference.

BACKGROUND OF THE INVENTION

The invention concerns a filter system with a filter element and a secondary element, in particular as an air filter of an internal combustion engine or of a compressed air compressor, as well as a filter element and a secondary element for such a filter system, and a method for exchange of the filter element in the filter system.

EP 1 163 039 B1 discloses an air filter with a cup-shaped housing in which a round filter cartridge is sealed-tightly installed such that the fluid to be cleaned flows through the filter insert from an inlet to an outlet. One of the housing shells is produced as one piece together with a support tube which is provided for receiving the filter cartridge and which supports a filter medium at the clean side. Moreover, the support tube and the round filter cartridge are conically embodied. The support tube is embodied in this context such that, viewed in axial direction of the cup housing, no undercuts are provided. Since the support comprises a grid-like structure, this is possible only in case of a conical shape.

SUMMARY OF THE INVENTION

It is an object of the invention to create a filter system with a filter element which enables a simple and safe exchange of the filter element.

Further objects of the invention are providing a method for exchange of a filter element in a filter system as well as providing a filter element and a secondary element for such a filter system.

The aforementioned objects are solved according to an aspect of the invention by a filter system for filtering a fluid, comprising a filter housing; a central tube arranged concentrically to a housing axis and comprising over at least a portion of its axial length a radially open region and preferably over a second portion of its axial length a tubular closed fluid-impermeable region; a secondary element which is embodied in a tubular shape and is arranged within the central tube so as to be slidable along the housing axis between at least two operating positions; as well as a filter element, wherein the filter element comprises a filter bellows, arranged about the longitudinal axis of the filter element, with a first end plate at a first end face and a second end plate at a second end face, wherein the end plates have central openings for receiving the central tube in the interior of the filter element; and wherein the secondary element in the first operating position opens a fluid path through the open region of the central tube and in the second operating position closes off the fluid path through the open region.

Beneficial configurations and advantages of the invention result from the additional claims, the description, and the drawing.

A filter system for filtering a fluid is proposed, comprising a filter housing comprised of a housing top part and a housing bottom part which extend along a housing axis; an inlet socket arranged at the filter housing for supply of a fluid to be filtered; an outlet socket, arranged at the housing bottom part in particular concentrically to the housing axis, for discharging the filtered fluid; a central tube arranged concentrically to the housing axis and connected in flow communication with the outlet socket in at least one operating state and comprising at least over a portion of its axial length a radially open region; a secondary element which is embodied in a tubular shape and is arranged within the central tube so as to be slidable along the housing axis between at least two operating positions; as well as a filter element that separates fluid-tightly a raw fluid side from a clean fluid side. Connected in flow communication means in particular that fluid from the interior of the central tube, or from the secondary element arranged therein, can flow into the outlet socket that is arranged in particular in continuation of the central tube. The filter element comprises a filter bellows, which is arranged about the longitudinal axis of the filter element, with a first end plate at a first end face and a second end plate at a second end face, wherein the end plates have central openings for receiving the central tube in the interior of the filter element. The secondary element opens in the first operating position a fluid path through the open region of the central tube and closes in the second operating position the fluid path through the open region.

Preferably, the radially open region of the central tube extends over half of the total axial length of the central tube. Further preferred, the radially closed region of the central tube extends correspondingly over the other half of the total axial length of the central tube. In this context, it is particularly preferred that the radially open region is arranged facing the outlet socket and the radially closed region is arranged facing away from the outlet socket.

The secondary element serves usually as a safety element of the filter system which, when exchanging the filter element, prevents that dirt particles can reach the clean fluid side. At least a part of the secondary element is therefore provided with a filter medium. In the prior art, the secondary element is connected non-movably to the filter housing. Therefore, in the normal operating state, the air as a fluid to be filtered flows always first through the filter element and then through the secondary element so that the air is subjected to an additional flow resistance.

According to the invention, this can be advantageously avoided because the secondary element can assume various installation states in that it is slidably arranged in the central tube. The central tube comprises for this purpose an open region that can be closed by the secondary element in an operating position and can be opened in another operating position. Thus, in the normal filter operation, a bypass in or at the central tube can be opened through which the air flow can bypass the secondary element. When an exchange of the filter element is to be carried out, the open region of the central tube can be closed by the secondary element so that, when exchanging the filter element, no dirt particles can reach the clean fluid side but the air is filtered by the secondary element. In both operating positions, the radially open region of the central tube is flowed through wherein the secondary element is flowed through downstream in the operating position in which it closes the open region.

The filter element is embodied open at both ends for receiving the central tube but seals at both ends against the filter housing, namely against the housing bottom part as well as against the central tube which is connected to the housing bottom part. The filter element however does not seal against the housing top part that, as a cover, can be removed for exchange of the filter element. When the filter housing is closed, i.e., the housing top part is attached to the housing bottom part, the housing top part can dip through the opening in the top end plate radially inwardly or outwardly below the end face plane of the central tube or can be arranged at least so close to the end face plane that the facing end of the filter element, which is of an open configuration, can be closed thereby.

According to the invention, the flow resistance of the filter system, which is created by a normal secondary element in any operating state, can advantageously be reduced in this way. The flow resistances for secondary elements of air filters are typically in the range of 1 mbar-50 mbar for the standard volume streams of various constructive sizes. Due to the bypass solution for the filter system, this flow resistance is advantageously reduced.

A further advantage resides in a reduction of the size and of the material consumption for the secondary element. The prior art secondary element which is flowed through constantly is dimensioned to be very large in order to exhibit a flow resistance as low as possible. Due to a bypass, the secondary element can be dimensioned so small that the load capacity of the secondary element is just sufficient for the comparatively short period of time of the filter element exchange.

According to an advantageous embodiment, the secondary element can have an axial length that is at least as large as the portion of the axial length of the radially open region of the central tube. In this way, the secondary element can cover the open region in the second operating position for the exchange of the filter element in that the secondary element in the central tube is pushed in front of the open region so that no unfiltered air can reach the clean fluid side.

According to an advantageous embodiment, the secondary element can comprise at its radial outer side sealing surfaces and/or seals for sealing against the central tube. The secondary element can thus effectively realize its filter function for the exchange of the filter element because no unfiltered air can pass from the raw fluid side to the clean fluid side.

According to an advantageous embodiment, the sealing surfaces and/or seals can be arranged at opposite ends of the secondary element. In this way, it is possible to provide the entire length of the secondary element with the filter medium because the secondary element can thus be sealed at the ends against the central tube. In this way, a filter action of the secondary element as large as possible can be achieved.

According to an advantageous configuration, the filter element may comprise seals, one of which is provided for sealing the raw fluid side relative to the filter housing and one of which is provided for sealing against the central tube. In this way, it is possible to open the filter housing by removing the housing top part in order to remove the filter element without there being the risk of contaminating the clean fluid side with dirt particles. The housing top part therefore must not seal relative to the clean fluid side but only relative to the environment.

According to an advantageous embodiment, at least one of the seals of the filter element can be connected to one of the end plates. By a common manufacture of end plates and seals, for example, in a plastics foaming process, for example, with polyurethane, end plates and seals of the filter element can be produced inexpensively which enables an overall inexpensive design of the manufacturing costs of a filter element. Also, sealing problems between filter bellows and seal are effectively avoided in this way.

According to an advantageous embodiment, the seal at the first end plate for sealing against the filter housing can be configured as axial seal and/or radial seal and/or the seal at the second end plate for sealing against the central tube can be configured as a radial seal. Such a configuration of the seals makes it possible to push the filter element onto the central tube and to seal effectively between raw fluid side and clean fluid side by bearing against the bottom of the housing bottom part. Moreover, the radial seal can seal in an effective way the filter element against the central tube and thereby seal also between raw fluid side and clean fluid side.

According to an advantageous configuration, the secondary element can be closed at an end which is facing away from the outlet socket. By the closure of the secondary element at one end, the clean fluid side is effectively closed when sliding the secondary element in front of the open region of the central tube. In this way, no additional cover of the central tube that is open at an upper end is required when removing the filter element. Also, the housing top part therefore must not seal the central tube in normal filter operation which enables a more beneficial design of the tolerance situation in the manufacture of the filter housing.

According to an advantageous embodiment, a wall of the secondary element may comprise at least in sections thereof a filter medium. In this way, it is possible to provide by means of the secondary element an emergency filter operation of the filter system when the filter element has been removed from the filter housing, for example, for filter element exchange. In this way, for example, a filter element exchange can be performed while the internal combustion engine is running because the air that is passing from the filter system to the internal combustion engine can be filtered by the secondary element when the secondary element is pushed in front of the open region of the central tube and covers this region.

According to an advantageous embodiment, the filter element can be configured as a round filter. A filter element embodied as a round filter can be pushed in a simple way onto a central tube that is also round. In a simple way, an effective sealing action between filter housing and filter element as well as between central tube and filter element can be ensured also in this context.

According to an advantageous embodiment, the filter element can be of a hollow cylindrical configuration. A filter element of a hollow cylindrical configuration can be pushed in a particularly simple and reliable way onto a round central tube. In a particularly simple and reliable way, an effective sealing action between filter housing and filter element as well as between central tube and filter element can be ensured also in this context.

According to an advantageous embodiment, the central tube can be closable at an end face plane facing away from the outlet socket when closing the filter housing with the housing top part. In this way, as a further safety, in addition to the secondary element closed at the upper end, an effective sealing action between raw fluid side and clean fluid side in the normal filter operation can be achieved. In this way, the seal between secondary element and central tube can be relieved also.

According to an advantageous embodiment, the housing top part can dip into the end face plane of the central tube when the filter housing is closed. In this way, the filter system can be additionally stiffened because in this way the upper end of the central tube which is facing away from the outlet socket can be connected to the housing top part and the central tube can be securely held in this way. In this way, the filter system becomes less sensitive relative to possible vibrations and shocks in operation.

According to a further aspect, the invention concerns a method for exchange of a filter element in a filter system, comprising the steps: removal of a housing top part from a housing bottom part of a filter housing; displacing a secondary element along a housing axis such that the secondary element closes a fluid path through an open region of a central tube of the filter housing; removal of the filter element from the central tube along the housing axis.

According to the invention, when exchanging the filter element, the secondary element can be pushed advantageously into the second operating position so that the secondary element covers the open region of the central tube, whereby the open bypass of the fluid flow in the normal filter operation is closed. The air which is flowing to the clean air side is thus additionally filtered by the secondary element. In this way, after opening the filter housing, the filter element can be removed by being pulled from the central tube and exchanged. After insertion of a new filter element in reverse sequence by pushing it onto the central tube, the secondary element can be pushed again into the first operating position where it opens the open region of the central tube as a bypass. Subsequently, the housing top part can be pushed again onto the housing bottom part and the filter housing can be closed in this way. Thus, the filter system is fully operational again.

According to a further aspect, the invention concerns a secondary element for use in a filter system wherein the secondary element is embodied in a tubular shape and is arranged within a central tube so as to be slidable along a housing axis of a filter housing of the filter system between at least two operating positions. A wall of the secondary element comprises at least in sections thereof a filter medium in this context.

The secondary element serves as a safety element of the filter system which, when exchanging the filter element, prevents that dirt particles can reach the clean fluid side. At least a portion of the secondary element is provided therefore with a filter medium.

According to the invention, the secondary element can assume various installation states in that it is slidably arranged in the central tube which comprises an open region that can be closed by the secondary element in an operating position and can be opened in another operating position. Thus, in the normal filter operation, a bypass in the central tube can be opened through which the air flow can bypass the secondary element. When an exchange of the filter element is to be carried out, the open region of the central tube can be closed with the secondary element so that upon exchange of the filter element no dirt particles can reach the clean fluid side but the air is filtered additionally by the secondary element.

According to a further aspect, the invention concerns a filter element for use in a filter system, with longitudinal axis, comprising a filter bellows, arranged about the longitudinal axis of the filter element, with a first end plate at a first end face and a second end plate at a second end face. In this context, the end plates comprise openings for receiving a central tube of a filter housing in the interior of the filter element.

The filter element is embodied open at both ends for receiving the central tube but seals at both ends against the filter housing, namely advantageously against a housing bottom part as well as against a central tube which is connected to the housing bottom part. The filter element however does not seal against a housing top part which, as a cover, can be removed for exchanging the filter element. When the filter housing is closed, i.e., the housing top part is attached to the housing bottom part, the housing top part can dip through the opening in the upper end plate radially inwardly or outwardly below the end face plane of the central tube, or can be at least arranged so close to the end face plane, that the facing end of the filter element, which is of an open configuration, can be axially supported thereby.

BRIEF DESCRIPTION OF THE DRAWINGS

Further advantages result from the following drawing description. In the drawings, embodiments of the invention are illustrated. The drawings, description, and the claims contain numerous features in combination. A person of skill in the art will consider the features expediently also individually and combine them to other expedient combinations.

DESCRIPTION OF PREFERRED EMBODIMENTS

Figure 1:
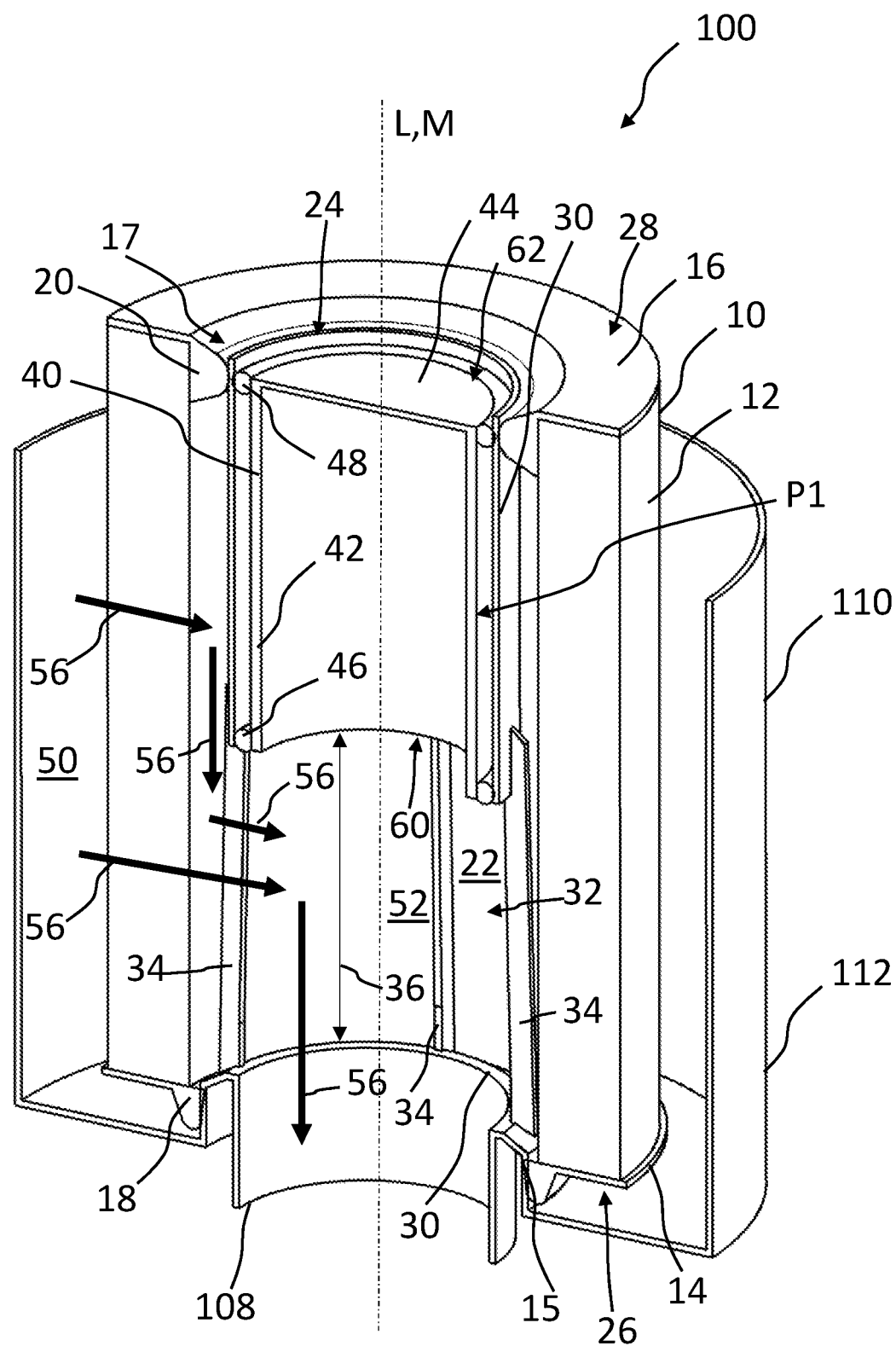
FIG. 1 shows a perspective longitudinal section of a filter system according to an embodiment of the invention with a secondary element in a first operating position and open filter housing.

In the Figures, same or same-type components are identified with same reference characters. The Figures show only examples and are not to be understood as limiting.

FIG. 1 represents a perspective longitudinal section of a filter system 100 according to an embodiment of the invention with a secondary element 40 in a first operating position P1 and an open filter housing 110.

The filter system 100 comprises a filter housing 110 of a housing top part 114, which has been omitted in FIG. 1, and a housing bottom part 112, which extends along a housing axis M, as well as an inlet socket (not illustrated) arranged at the filter housing 110 for supply of a fluid to be filtered, and an outlet socket 108, which is arranged at the housing bottom part 112 concentrically to the housing axis M, for discharge of the filtered fluid. A central tube 30, which is concentrically arranged to the housing axis M and which is connected in flow communication to the outlet socket 108 in at least one operating state and which comprises a radially open region 32 at least over a portion 36 of its axial length, is connected to the housing bottom part 112. The radially open region is facing the outlet socket 108 and, as illustrated, is preferably embodied in direct continuation of the outlet socket in particular non-detachably or monolithically with the housing bottom part 112 and is stiffened or formed by axial stays 34 of the central tube 30. A secondary element 40, which is of a tubular configuration, is arranged so as to be slidable along the housing axis M within the central tube 30 between at least two operating positions P1, P2. The radially closed region of the central tube 30 is embodied preferably of a closed tubular configuration, adjoins the radially open region, and is facing away from the outlet socket 108. As illustrated, the end of the central tube 30 or of the radially closed region which is facing away from the outlet socket 108 is preferably embodied open in order to be able to service the secondary element 40.

Furthermore, a filter element 10 that fluid-tightly separates a raw fluid side 50 from a clean fluid side 52 is arranged in the filter housing 110 wherein the filter element 10 comprises a filter bellows 12, which is arranged about the longitudinal axis L of the filter element, with a first end plate 14 at a first end face 26 and a second end plate 16 at a second end face 28. The filter element 10 is embodied as a hollow cylindrical round filter. The end plates 14, 16 of the filter element 10 comprise central openings 15, 17 for receiving the central tube 30 in the interior 22 of the filter element 10. The filter bellows 12 is flowed through by air from the exterior to the interior in radial direction, which is illustrated by the fluid path 56. The filtered air is discharged through the outlet socket 108 from the filter housing 110.

The filter element 10 comprises seals 18, 20, one of which is provided for sealing the raw fluid side 50 relative to the filter housing 110 and one of which is provided for sealing against the central tube 30. The seals 18, 20 are connected to the end plates 14, 16 and can be produced, for example, together with the end plates 14, 16 by a plastics foaming process. The seal 18 at the first end plate 14 is embodied for sealing relative to the filter housing 110 as a radial seal, as is preferred. The seal 20 at the second end plate 16 is embodied for sealing against the central tube 30 as a radial seal.

The secondary element 40 in the first operating position P1, which is illustrated in FIG. 1, opens the fluid path 56 through the open region 32 of the central tube 30 and closes in the second operating position P2 the fluid path 56 through the open region 32. The secondary element 40 comprises for this purpose an axial length that is at least as long as the portion 36 of the axial length of the radial open region 32 of the central tube 30. Moreover, the secondary element 40 comprises at its radial outer side sealing elements in the form of sealing surfaces and/or seals 46, 48 for sealing against the central tube 30 or the housing bottom part 112. The sealing surfaces and/or seals 46, 48 are arranged at opposite ends 60, 62 of the secondary element 40. The secondary element 40 is closed at an end 62 which is facing away from the outlet socket 108 by a cover so that the central tube 30, in which the secondary element 40 is seal-tightly slidably arranged with the seals 46, 48, is sealed by the secondary element 40 relative to the raw fluid side 50. The wall 42 of the secondary element 40 comprises at least in sections thereof a filter medium so that air can pass through the secondary element 40, when it is pushed in front of the open region 32 of the central tube 30, in radial direction from the exterior through the secondary element 40 and the air is filtered thereby.

Figure 2:
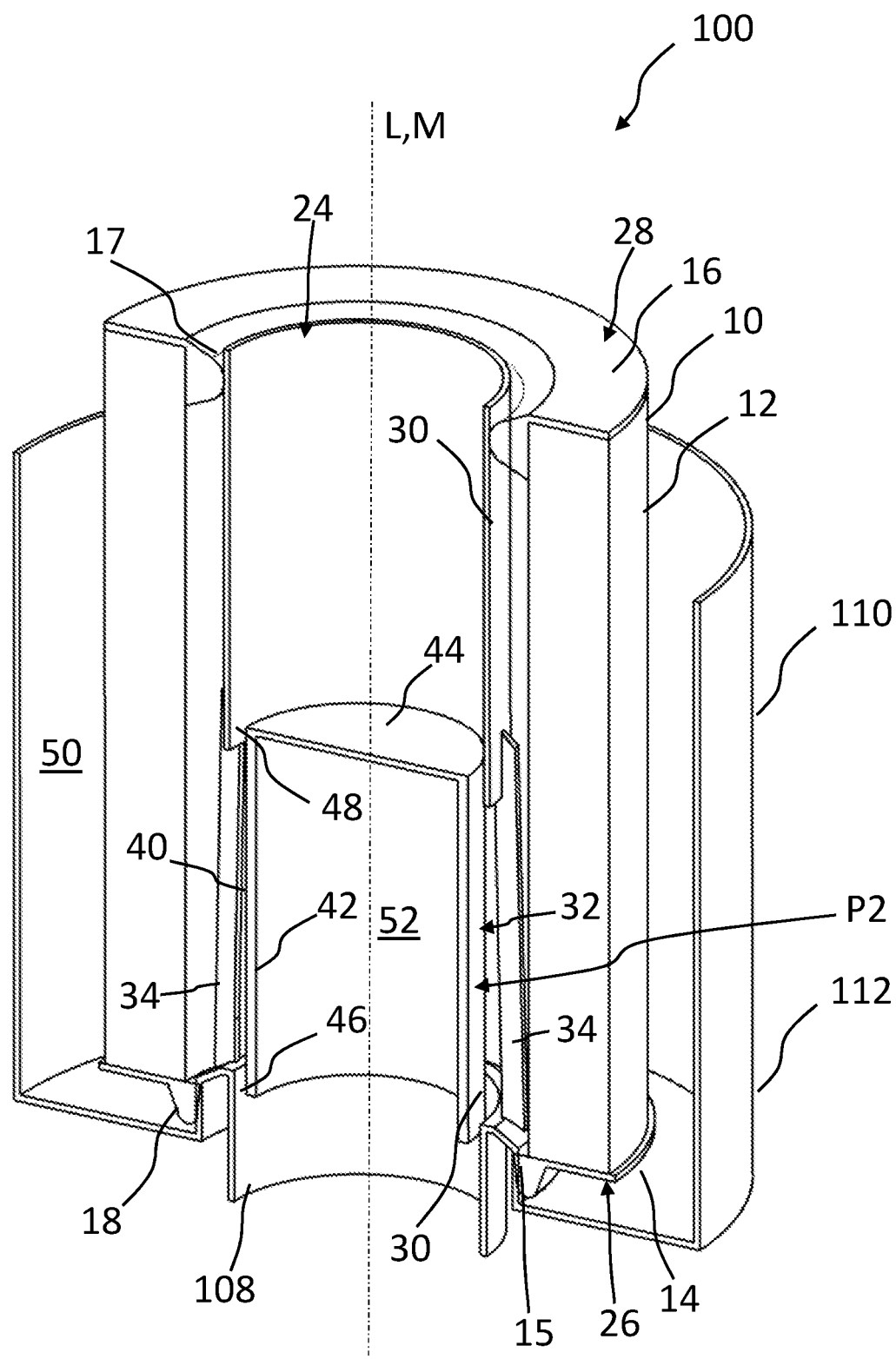
FIG. 2 shows a perspective longitudinal section of the filter system in FIG. 1 with the secondary element in a second operating position.

FIG. 2 shows a perspective longitudinal section of the filter system 100 in FIG. 1 with the secondary element 40 in a second operating position P2. In this operating position P2, the secondary element 40 is pushed in front of the open region 32 of the central tube 30, i.e., into a position downstream, in particular immediately downstream, of the open region 32 of the central tube 30 and covers it completely. The secondary element 40 seals with its seals 46, 48 against the inner side of the central tube 30 and with its cover 44 relative to the raw fluid side 50 so that flowing air can pass to the clean fluid side 52 only through the wall 42 of the secondary element 40, which is embodied as a filter medium, and is thereby also filtered.

Figure 3:
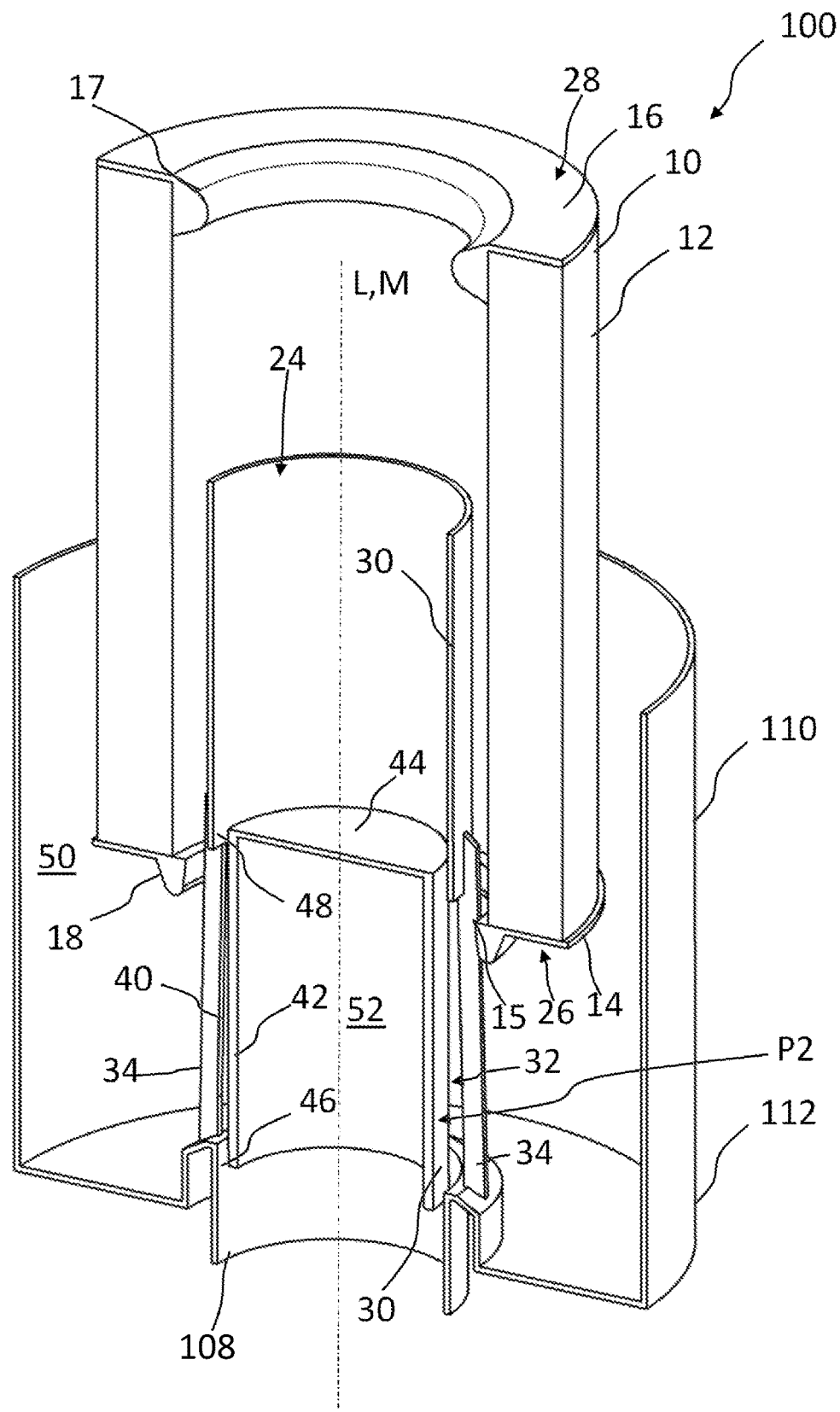
FIG. 3 shows a perspective longitudinal section of the filter system in FIG. 1 with the secondary element in a second operating position during removal of the filter element.

In FIG. 3, a perspective longitudinal section of the filter system 100 in FIG. 1 is illustrated with the secondary element 40 in the second operating position P2 during removal of the filter element 10.

For exchange of the filter element 10, first the housing top part 114 is removed from the housing bottom part 112 of the filter housing 110. Then, the secondary element 40 is moved along the housing axis M such that the secondary element 40 closes the fluid path 56 through the open region 32 of the central tube 30 of the filter housing 110, as is illustrated in FIG. 3 in the operating position P2. Thus, the clean fluid side 52 is effectively separated by the secondary element 40 from the raw fluid side 50 so that only air that has been filter by the secondary element 40 can reach the clean fluid side 52. Accordingly, the filter element 10 can be removed from the central tube 30 along the housing axis M in upward direction.

When inserting a new filter element 10, the reverse sequence is observed. First, the filter element 10 is pushed onto the central tube 30 until it contacts the bottom in the housing bottom part 112 and is seal-tightly arranged against the housing bottom part 112 and the central tube 30. Subsequently, the secondary element 40 can be pushed into the first operating position P1 in upward direction and the open region 32 can thus be opened as a bypass for the fluid path 56. Finally, the housing top part 114 is attached and the filter system 100 is again in the operation-ready state.

Figure 4:
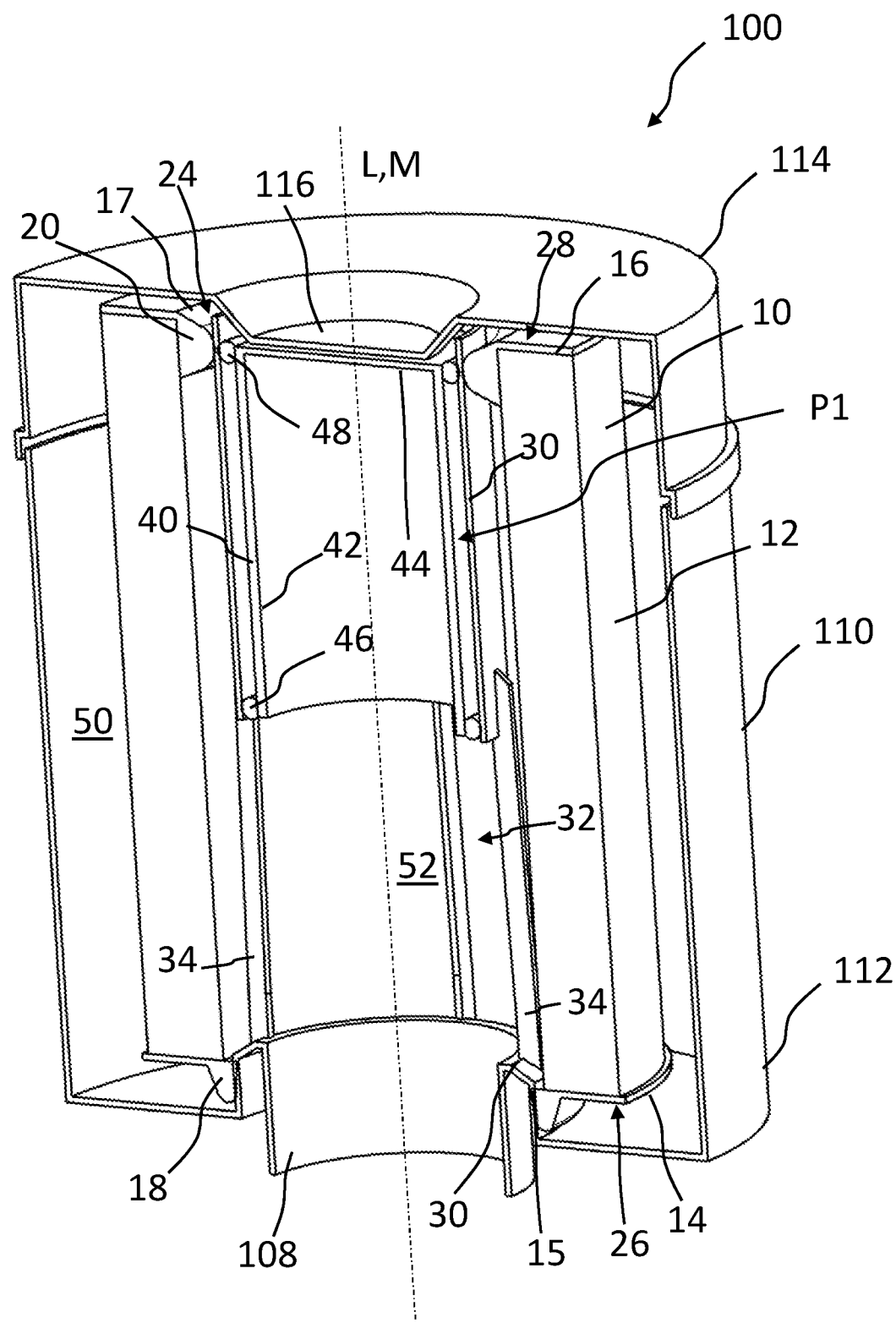
FIG. 4 shows a perspective longitudinal section of the filter system in FIG. 1 with the secondary element in the first operating position and closed filter housing.

FIG. 4 shows a perspective longitudinal section of the filter system 100 in FIG. 1 with the secondary element 40 in the first operating position P1 and closed filter housing 110 in which the housing top part 114 is attached to the housing bottom part 112. In this context, the housing top part 114 dips, with the filter housing 110 closed, into the end face plane 24 of the central tube 30 with a central depression 116 and can serve as a stop for the secondary element 40. The central tube 30 is closed at the end face plane 24 facing away from the outlet socket 108 by the secondary element 40. Since the housing top part 114 dips into the end face plane 24 of the central tube 30 with a central depression 116, the central tube 30 can be additionally secured at this end by means of the placed-on depression 116 of the housing top part 114 and stiffened with regard to vibrations or shocks. In this context, the depression 116 of the housing top part 114 engages centrally through the end plate 16 of the filter element 10, which is enabled by the opening 17 of the end plate 16.

What is claimed is:

1. A filter system for filtering a fluid, the filter system comprising:
    a filter housing comprising a housing top part and a housing bottom part, wherein the housing top part and the housing bottom part extend along a housing axis of the filter housing;
    an inlet socket, arranged at the filter housing, configured to supply a fluid to be filtered;
    an outlet socket, arranged at the housing bottom part, configured to discharge the fluid after filtration;
    a central tube arranged concentrically to the housing axis in the filter housing and connected in flow communication with the outlet socket in at least one operating state, wherein the central tube, over at least a portion of an axial length of the central tube, comprises a radially open region;

a secondary element arranged within the central tube so as to be slidable along the housing axis between at least a first operating position and a second operating position, wherein the secondary element is tubular;

a filter element configured to be arranged in the filter housing and to separate fluid-tightly a raw fluid side from a clean fluid side, wherein the filter element comprises a filter bellows arranged about a longitudinal axis of the filter element, wherein the filter bellows comprises a first end plate at a first end face of the filter bellows and further comprises a second end plate at a second end face of the filter bellows, wherein the first and second end plates each comprise a central opening configured to receive the central tube in an interior of the filter element; and wherein the secondary element in the first operating position is arranged within the central tube at a first distance from the housing top part along the housing axis and opens a fluid path through the radially open region of the central tube and in the second operating position is arranged within the central tube at a second distance from the housing top part along the housing axis that is greater than the first distance and closes the fluid path through the radially open region of the central tube.

2. The filter system according to claim 1, wherein the outlet socket is arranged concentrically relative to the housing axis.

3. The filter system according to claim 1, wherein the secondary element comprises an axial length that is at least as long as said portion of the axial length of the central tube.

4. The filter system according to claim 1, wherein the secondary element comprises a radial outer side comprising sealing elements configured to seal against the central tube, wherein the sealing elements are selected from sealing surfaces; seals; or sealing surfaces and seals.

5. The filter system according to claim 4, wherein the sealing elements are arranged at opposite ends of the secondary element.

6. The filter system according to claim 1, wherein the filter element comprises a first seal configured to seal the raw fluid side relative to the filter housing and further comprises a second seal configured to seal against the central tube.

7. The filter system according to claim 6, wherein at least one of the first and second seals is connected to one of the first and second end plates.

8. The filter system according to claim 6, wherein the first seal is arranged at the first end plate and is embodied as an axial seal.

9. The filter system according to claim 6, wherein the second seal is arranged at the second end plate and is embodied as a radial seal.

10. The filter system according to claim 6, wherein the first seal is arranged at the first end plate and is embodied as an axial seal and wherein the second seal is arranged at the second end plate and is embodied as a radial seal.

11. The filter system according to claim 6, wherein the secondary element is closed at an end facing away from the outlet socket.

12. The filter system according to claim 1, wherein the secondary element comprises a wall, wherein the wall is comprised at least in sections thereof of a filter medium.

13. The filter system according to claim 1, wherein the filter element is a round filter.

14. The filter system according to claim 13, wherein the round filter comprises a hollow cylindrical shape.

15. The filter system according to claim 1, wherein, when closing the filter housing, the central tube is configured to be closed by the housing top part at an end face plane of the central tube facing away from the outlet socket.

16. The filter system according to claim 15, wherein the housing top part, when the filter housing is closed, dips into the end face plane of the central tube.

17. A filter system for filtering a fluid, the filter system comprising:

a filter housing comprising a housing top part and a housing bottom part, wherein the housing top part and the housing bottom part extend along a housing axis of the filter housing;

an outlet socket, arranged at the housing bottom part, configured to discharge the fluid after filtration;

wherein the outlet socket comprises an outlet opening through the housing bottom part that is arranged concentrically relative to the housing axis;

a central tube arranged concentrically to the housing axis in the filter housing and connected in flow communication with the outlet socket in at least one operating state, wherein the central tube, over at least a portion of an axial length of the central tube, comprises a radially open region;

a secondary element arranged within the central tube so as to be slidable along the housing axis between at least a first operating position and a second operating position, wherein the secondary element is tubular;

a filter element configured to be arranged in the filter housing and to separate fluid-tightly a raw fluid side from a clean fluid side, wherein the filter element comprises a filter bellows arranged about a longitudinal axis of the filter element, wherein the filter bellows comprises a first end plate at a first end face of the filter bellows and further comprises a second end plate at a second end face of the filter bellows, wherein the first and second end plates each comprise a central opening configured to receive the central tube in an interior of the filter element; and wherein the secondary element in the first operating position is arranged within the central tube at a first distance from the housing top part along the housing axis and opens a fluid path through the radially open region of the central tube and in the second operating position is arranged within the central tube at a second distance from the housing top part along the housing axis that is greater than the first distance and closes the fluid path through the radially open region of the central tube.

18. A filter system for filtering a fluid, the filter system comprising:

a filter housing comprising a housing top part and a housing bottom part, wherein the housing top part and the housing bottom part extend along a housing axis of the filter housing;

an outlet socket, arranged at the housing bottom part, configured to discharge the fluid after filtration;

a central tube arranged concentrically to the housing axis in the filter housing and connected in flow communication with the outlet socket in at least one operating state, wherein the central tube, over at least a portion of an axial length of the central tube, comprises a radially open region;

a secondary element arranged within the central tube so as to be slidable along the housing axis between at least a first operating position and a second operating position, wherein the secondary element is tubular;

a filter element configured to be arranged in the filter housing and to separate fluid-tightly a raw fluid side from a clean fluid side, wherein the filter element comprises a filter bellows arranged about a longitudinal axis of the filter element, wherein the filter bellows comprises a first end plate at a first end face of the filter bellows and further comprises a second end plate at a second end face of the filter bellows, wherein the first and second end plates each comprise a central opening configured to receive the central tube in an interior of the filter element; and wherein the secondary element in the first operating position is arranged within the central tube at a first distance from the housing top part along the housing axis and opens a fluid path through the radially open region of the central tube and in the second operating position is arranged within the central tube at a second distance from the housing top part along the housing axis that is greater than the first distance and closes the fluid path through the radially open region of the central tube; and wherein the secondary element comprises a first sealing element and a second sealing element, wherein the first sealing element and the second sealing element are disposed at a radial outer side of the secondary element, wherein, with the secondary element at the first operating position, the first sealing element and the second sealing element are between the radial outer side of the secondary element and the central tube, and wherein, with the secondary element at the second operating position, the first sealing element is between the radial outer side of the secondary element and the central tube and the second sealing element is between the radial outer side of the secondary element and the housing bottom part.

* * * * *